Patented Sept. 14, 1937

2,093,364

UNITED STATES PATENT OFFICE 2,093,364

ARTIFICIAL MASSES AND PROCESS FOR THEIR PRODUCTION

Elly Pollak, Vienna, Austria

No Drawing. Application February 16, 1935, Serial No. 6,909. In Austria February 19, 1934

15 Claims. (Cl. 260—3)

It is known that mono- and di-methylol urea can be obtained from urea and formaldehyde in aqueous solution in the presence of slight quantities of an alkali and at temperatures below 40° C. By the action of further quantities of formaldehyde upon these first reaction products there are obtained resinous bodies which become insoluble under the action of heat (Pollopas). Among the above-mentioned alkalies employed for the purpose of condensation there have also been proposed ammonia and hexamethylenetetramine.

The present invention relates to the production of artificial masses with the employment of urea and hexamethylenetetramine, and to the substances produced therefrom. These two compounds exhibit different reactivity and lead to other and novel products than urea and formaldehyde. In consequence of the greater reactivity of formaldehyde on urea in comparison with hexamethylenetetramine, in the presence of urea, formaldehyde, and hexamethylenetetramine the formaldehyde will first react with the urea, for which reason in the presence of slight quantities of hexamethylenetetramine or ammonia in comparison with formaldehyde a reaction between urea and hexamethylenetetramine does not occur. If however free formaldehyde be present in addition to hexamethylenetetramine, then the good properties of the products described below suffer thereby.

If hexamethylenetetramine and urea be heated in the presence or in the absence of a solvent there is soon set up a vigorous evolution of ammonia which persists throughout the entire duration of the reaction. At the same time methylene groups enter into the urea molecule and there is first evolved a crystallizing body of a melting point of 225–226° C. the analysis of which points to a dimethylene tricarbamide of the formula $NH_2.CO.NH.CH_2NH.CO.NH.CH_2.NH.CO.NH_2$ On the further action of hexamethylenetetramine there become formed resinous and still water-soluble substances, the low viscosity of their solutions pointing to a slight degree of polymerization. This reaction is completed in 40 to 50 hours in case of aqueous solutions being employed. In contrast to the colloidal solutions of the so-called soluble Pollopas resins even a 30% aqueous solution is still quite thinly liquid. Moreover, no precipitation reactions occur even on extensive dilution. These resins are of poor stability, and decompose for example in the moist state, gradually in the cold and more rapidly in the heat, with the cleaving off of ammonia and methyl amine, into ammonium carbonate, formaldehyde, and methylene urea.

In contrast to the intermediate products of the Pollopas series, these unstable soft resinous condensation products not even on being further heated become converted into insoluble resins. Under certain conditions, however, soluble hard resins are to be obtained from these soft resins, said soluble hard resins serving as starting material for the production of high quality insoluble products of vitreous character.

Before the soft resinous condensation product is converted into the soluble hard resin, a purifying process is advisable in view of the fact that in spite of the long duration of the boiling process particles of unconsumed starting materials are still to be found in the solution; moreover a formation of undesired secondary products has taken place. By these impurities the later reactions could be disturbed. The purification is effected by means of organic solutions, such as alcohol, acetylene tetrachloride, hydrogenated derivatives of naphthalene, mixtures of benzol and methyl ethyl ketone, etc., washing out the impurities. By treatment with alcohol for example the main mass which is valuable for further working up becomes merely swollen, while the secondary products evolved become dissolved. In view of the unmanageability and stickiness of the mass this washing process which takes place at high temperatures is however somewhat difficult.

The thus purified, still sticky main mass is heated for a considerable length of time to temperatures above 100°, preferably to 110–130° C. This heating can also be replaced by a treatment with dehydrating agents. If a suitable organic solvent such as for example 96% alcohol be employed for this purpose, this has the advantage that the above described purifying process can proceed simultaneously. In the course of this treatment the mass loses its hygroscopicity and represents a pulverizable commercial product which is then suitable for being further worked up into an insoluble product. During the heating there manifestly occurs a ring formation by which a portion of the methylol groups present is eliminated with the cleaving off of water. This product also is not perfectly stable in the moist state, and does not precipitate out even on extensive dilution of the aqueous solution. The aqueous solution can, however, be reconcentrated by evaporation within a short time, even at low temperatures. This soluble hard resin can be utilized for example as a vulcanizing accelerator or as a manure of high nitrogen content.

Now, by further experiments, it has transpired, that the course of the entire process is considerably simplified with the ammoniacal process being carried out in the presence of very slight quantities of acid or salts. In consequence of this addition, the condensation reaction leading to the unstable soft resinous product takes place much more rapidly. When working in aqueous solutions the condensation process can be concluded in 18–24 hours. Moreover no harmful secondary products are evolved so that the above described treatment with organic solvents can be dispensed with. When working in the fusing process the methylol group formation during the subsequent boiling process in aqueous solution is perfected and accelerated. The elimination of water can also be effected with the employment of lower temperatures and within a shorter length of time, so that during this stage of the manufacturing process also, slight quantities of secondary products which are insoluble in water are formed. With these slight quantities of acids or salts which are added, the liquid or melt is ammoniacal from the first moment on, and remains so up to the termination of the condensation process, since the acid is immediately neutralized by the ammonia evolved and by the other nitrogenous bases present.

The additions may be: free acids such as hydrochloric acid, nitric acid, sulphuric acid, phosphoric acid, or equally acetic acid, formic acid, and the like. In addition to the free acids there can also be employed the readily soluble salts thereof. More particularly ammonium or urea salts, but also for example metal salts, yield suitable results. It has transpired that for example with the use of hydrochloric acid or its ammonium salts, some 1.3 parts by weight of anhydrous acid for every 1000 parts by weight of the urea used are most favourable, while with the employment of nitric acid 2 parts by weight, and with the employment of phosphoric acid 5 parts by weight for every 1000 parts by weight of urea should be used. The suitable additions to be used must be ascertained experimentally for each individual acid, and bear no direct relation to the strength of the acid. The quantities of acid specified above have proved capable of giving particularly favourable results, but the advantages are also achieved when the additions are given in considerably slighter amounts. The improvement of the process is discernible for example even with $\frac{1}{10}$ of the specified quantities.

The soluble hard resins heretofore described permit of being converted by means of formaldehyde into an insoluble resin as clear as glass, of surprising hardness and power of resistance. The formaldehyde is added after removal of the constituents which are insoluble in water, preferably in such quantities that 3 mols of formaldehyde are used for every 6 mols of the urea originally employed. After concentration of the solution by evaporation until it is fit for casting the hardening process is carried out in a weakly acid solution. It has now been found that the gelatinizing, which starts at about 60° C., can be increased gradually to approximately 140° C., whereby the hardening process is very favourably affected. This process is, surprisingly, concluded in an extremely short time (24–28 hours), although with the known urea condensation products it requires several weeks. This can be explained by the low viscosity of the solutions employed for the hardening process, which solutions retain but slight quantities of water.

In the production of a glass-clear insoluble final product by the employment of those reaction products evolved in the presence of acids or salts, it is advisable to proportion the quantities of acids or salts from the outset so low that they just will bring about the conversion of the soluble solid intermediate product into the insoluble resin. It will be understood that if too large quantities of acid be added from the outset, any surplus of free acid must be neutralized before the carrying out of the hardening process in order to obtain a transparent insoluble resin in the piece.

The advantage of employing additions of acids or salts is particularly set forth by the good properties of the insoluble hard resin. When $\frac{1}{10}$ of the above indicated quantities of the catalyst be employed, the described purifying process by means of organic solvents can however not yet be dispensed with, if resins fast to boiling and insoluble are to be obtained.

The novel final product obtained by the hardening process is obtainable as clear as glass, is insoluble in all solvents, and is not attacked even by water at boiling temperatures. The latter is a property not possessed by any single hitherto obtained condensation product produced with the use of urea and formaldehyde as the starting materials.

The resinous products removed in the above described washing with organic solvents can likewise be converted with formaldehyde, and yield further quantities of insoluble resins, but these possess very considerably less power of resistance.

If the described process be initiated in the absence of a solvent, it is advisable to intermix urea and hexamethylenetetramine thoroughly, after which they are fused. During this stage the reaction temperature should be set so low that no biuret results. The carrying out of the process in the melt offers advantages, among others in consequence of the increased speed, but the complete absence of water has the disadvantage that the necessary methylol groups can not become evolved. The resin product formed in the melt is thus different from the product obtained in aqueous solution. It possesses a higher nitrogen content, and must be reboiled with water for some hours to convert it, with the cleaving off of ammonia, into a product which is presumably identical with the product obtained in aqueous solution.

It is deserving of special mention that the good properties and the yield both of soluble intermediate products and also of insoluble final products depend entirely on the quantitative proportions of the two components. It has transpired that the best results are obtainable with the use of 6 mols of urea for every 8 methylene groups or slightly more. If larger quantities of hexamethylenetetramine be employed, the same does not become completely consumed and is still detectable in the final products. If smaller quantities of hexamethylenetetramine be employed, the clearness and purity of the product suffers; also blistering is unavoidable. When carrying out the process in aqueous solution, it is equally possible to proceed, instead of from hexamethylenetetramine, from formaldehyde and ammonia in the proportions of 6:4. In doing this, however, the use of surplus formaldehyde must be strictly avoided, since the power of the insoluble final product to resist boiling would suffer otherwise.

If the hardening process be interrupted before the attainment of the insoluble final state, the mass is still brittle and can accordingly readily be pulverized and set aside for further use. If desired it can be moulded in the hot press, either alone or mixed with filling materials, to shaped articles.

The solutions of the intermediate products also permit of being used as resin solutions for the production of insoluble artificial resins inside porous or fibrous materials or on foundations of all kinds for varnish coatings. In order to accelerate the hardening process as far as possible for impregnating purposes there can be made use of a greater initial addition of acid. It further goes without saying that the masses may be mixed at any stage with filling and colouring matter, and that it is possible in this manner to obtain variegated effects of all kinds.

The process can be carried out for example as follows:—

*Example 1.*—36 parts by weight of urea and 18.67 parts by weight of hexamethylenetetramine are boiled with 60 parts of water under reflux until the solution exhibits milky turbidity, for which purpose it is generally necessary to boil for 40-50 hours. The solution is then concentrated by evaporation until it no longer falls from a glass rod in the form of drops, in the course of which it attains a temperature of some 110° C. Heat treatment is then applied several times with 50 parts by weight of acetylene tetrachloride or tetralin with thorough agitation, until the unchanged starting materials still present and other constituents passing into solution have been removed. The residual resin, which is thickly liquid in the cold, is then heated to temperatures of the order of 110-130° C. until it has lost about 10% of its weight. In the course of this procedure the mass becomes gradually firmer and finally exhibits in the heat a frothy ropy consistency. On cooling it can be readily pulverized and keeps for a long time unaltered in the dry state.

The product obtained is pulverized, dissolved as rapidly as possible with 240 parts of boiling water, and at once cooled off again. A small part of the mass (some 5-10% of methylene urea) remains undissolved. After filtering, the mass is concentrated to syrupy consistency by evaporation at a temperature below 60° C. There are then added 24 parts by volume of formaldehyde solution of 40% strength, and distillation continued in vacuo until the mass is fit for casting, whereupon, after the addition of 1 part by volume of 10% formic acid, it is caused to gelatinize in the oven at 60° C. In this manner there is produced a shaped article which is absolutely as clear as glass, and which can readily be hardened by gradual elevation of the temperature to 120-140° C. in the course of 24 hours. The product is then insoluble.

*Example 2.*—36 parts by weight of urea are thoroughly intermixed with 18.67 parts by weight of hexamethylenetetramine and then heated at a temperature of 90-128° C. until the originally fused mass acquires a viscid consistency, and the evolution of ammonia relaxes. The mass is then dissolved hot in 80 parts by weight of water, heated for 4-6 hours under reflux, and then concentrated by evaporation on a water bath until the weight remains constant. The residue is a soft resinous hygroscopic mass which is cooled down and treated three times with 80 parts by volume of 96% alcohol each time. In this treatment only a relatively slight proportion becomes dissolved, while the greater part of the mass is left behind as somewhat more thickly liquid resin. The residue is then ground with acetone, to completely remove the alcohol. By this treatment the resin becomes converted into a pulverulent mass. After evaporation of the acetone, this product, for the purpose of hardening, is cleansed of constituents which are insoluble in water, and then hardened.

*Example 3.*—59.9 parts by weight of urea, 31.12 parts by weight of hexamethylenetetramine, 100 parts of water, and 0.25 part by weight of urea nitrate are heated for about 20 hours under reflux. The mass is then concentrated by evaporation, and, as soon as the boiling point of the solution has increased to 120°, emptied into tins and heated for 12-14 hours in the oven at 115-120°. The mass is then dissolved in water, filtered from the undissolved matter, and concentrated by evaporation in vacuo until fit for casting. 30 parts by volume of formaldehyde 40% strong are then added, and the insoluble glass-clear final product obtained in the oven at temperatures of 60-135°.

*Example 4.*—60 parts by weight of urea, 31.12 parts by weight of hexamethylenetetramine, and 0.1 part by weight of ammonium chloride are fused together and retained at a temperature of 90-128° C. until the originally thinly liquid melt gradually acquires viscid appearance. The same is then worked up as described in Example 2. The product obtained is similar in its properties to that given in Example 3.

*Example 5.*—60 grams of urea, 31.1 grams of hexamethylenetetramine, 120 ccs. of normal propylic alcohol and 0.25 gram of urea nitrate are heated for about 12 hours under reflux in the oil bath. Thereby a vigorous evolution of ammonia is set up, and within a few hours a resinous mass starts to precipitate out. The reaction, however, is not completed before some 12 hours.

On cooling down the resin separated out solidifies so that the solution can be easily run off. The solution of propylic alcohol is susceptible of further use. The resin is dissolved in 120 ccs. of water, concentrated until the remaining propylic alcohol has disappeared, heated to about 130° C. over an open flame so as to remain thinly liquid, and then further heated in the oven at 120-130° C. until it thickens strongly in the heat and becomes nearly solid; this operation requires 7 hours. The obtained product is worked up as usually by formaldehyde.

I claim:

1. A process for making a water-soluble hard resin capable of being hardened with formaldehyde, consisting in condensing together urea and hexamethylenetetramine in the presence of heat and in the absence of formaldehyde, removing any water present in the product, and converting the product into water-soluble hard resin by splitting off water therefrom.

2. A process for making a water-soluble hard resin capable of being hardened with formaldehyde, consisting in condensing together urea and hexamethylenetetramine in the approximate proportion of 6 mols of urea for every 8 methylene groups in the presence of heat and in the absence of formaldehyde, removing any water present in the product, and converting the product into water-soluble hard resin by splitting off water therefrom.

3. A process for making a water-soluble hard resin capable of being hardened with formaldehyde, consisting in condensing together urea and hexamethylenetetramine in the approximate proportion of 6 mols of urea for every 8 methylene groups in the presence of heat and in the absence of formaldehyde, the condensation being carried out in the presence of a solvent for the resulting condensation product, removing any water present in the product, and converting the product into water-soluble hard resin by splitting off water therefrom.

4. A process for making a water-soluble hard resin capable of being hardened with formaldehyde, consisting in fusing together, in the absence of formaldehyde, urea and hexamethylenetetramine in the approximate proportion of 6 mols of urea for every 8 methylene groups until the fused mass acquires a viscid consistency, extracting the mass with boiling water for some hours, removing water present in the mass, and converting the mass into a water-soluble hard resin by splitting off water therefrom.

5. A process for making a water-soluble hard resin capable of being hardened with formaldehyde, consisting in condensing together urea and hexamethylenetetramine in the approximate proportion of 6 mols of urea for every 8 methylene groups in the presence of heat and of small quantities of a catalyst for the condensation and in the absence of formaldehyde, removing any water present in the product and converting the product into water-soluble hard resin by splitting off water therefrom.

6. A process as claimed in claim 5 in which the catalyst is selected from the group consisting of acids and salts thereof.

7. A process for making a water-soluble hard resin capable of being hardened with formaldehyde, consisting in condensing together urea with hexamethylenetetramine in the approximate proportion of 6 mols of urea for every 8 methylene groups in the presence of heat and in the absence of formaldehyde, removing any water present in the product, and converting the product into water-soluble hard resin by treatment with alcohol.

8. A process for making a resinous condensation product consisting in condensing together urea and hexamethylenetetramine in the presence of heat and in the absence of formaldehyde, removing any water present in the product, converting the product into water-soluble hard resin by splitting off water therefrom, and hardening said soluble hard resin by means of formaldehyde.

9. A process for making a resinous condensation product consisting in condensing together urea and hexamethylenetetramine in the approximate proportion of 6 mols of urea for every 8 methylene groups in the presence of heat and in the absence of formaldehyde, removing any water present in the product, converting the product into water-soluble hard resin by splitting off water therefrom, and hardening said soluble hard resin by means of formaldehyde at a hardening temperature which starts at about 60° C. and is gradually increased to about 140° C.

10. A process as claimed in claim 9 in which three molecules of formaldehyde to six molecules of urea are employed in the hardening operation.

11. A process for making a resinous condensation product consisting in condensing together urea and hexamethylenetetramine in the approximate proportion of 6 mols of urea for every 8 methylene groups in the presence of heat and of small quantities of a catalyst for the condensation and in the absence of formaldehyde, removing any water present in the product, converting the product into water-soluble hard resin by splitting off water therefrom and hardening said soluble hard resin by means of formaldehyde, the quantity of catalyst used being just sufficient to catalyze also the hardening operation.

12. A process for making a resinous condensation product consisting in condensing together urea and hexamethylenetetramine in the approximate proportion of 6 mols of urea for every 8 methylene groups in the presence of heat and in the absence of formaldehyde, removing any water present in the product, converting the product into water-soluble hard resin by splitting off water therefrom incompletely hardening the water-soluble hard resin by treatment with formaldehyde, and pulverizing the resulting brittle mass.

13. A new water soluble hard resin, which is capable of being diluted in water to any degree, obtained by forming a water-soluble soft resin by condensing together urea and hexamethylenetetramine in the approximate proportion of 6 mols of urea for every 8 methylene groups in the presence of heat and in the absence of formaldehyde, removing any water present in the product, and then splitting off water from the product.

14. The new water-insoluble hard resin which is glass-clear, colourless and resistant to boiling water obtained by forming a water-soluble soft resin by condensing together urea and hexamethylenetetramine in the presence of heat and in the absence of formaldehyde, removing any water present in the product, spliting off water from the said product and then treating the product with formaldehyde.

15. The new water-insoluble hard resin which is glass-clear, colourless and resistant to boiling water obtained by forming a water soluble soft resin by condensing together urea and hexamethylenetetramine in the approximate proportion of 6 mols of urea for every 8 methylene groups in the presence of heat, and in the absence of formaldehyde, removing any water present in the product, splitting off water from the said product and then treating the product with formaldehyde.

ELLY POLLAK.